United States Patent
Vargo et al.

(10) Patent No.: US 6,958,562 B1
(45) Date of Patent: Oct. 25, 2005

(54) MOTOR STATOR AND HEAT SINK SYSTEM

(76) Inventors: James R. Vargo, 2947 Deerbrook St., Pomona, CA (US) 91767; Edward R. Vargo, 2947 Deerbrook St., Pomona, CA (US) 91767

( * ) Notice: Subject to any disclaimer, the term of this patent is extended or adjusted under 35 U.S.C. 154(b) by 0 days.

(21) Appl. No.: 10/774,737

(22) Filed: Feb. 9, 2004

(51) Int. Cl.[7] ............................. H02K 1/20; H02K 9/00
(52) U.S. Cl. ......................... 310/216; 310/64; 310/259
(58) Field of Search ........................... 310/34, 254, 89, 310/216–218

(56) References Cited

U.S. PATENT DOCUMENTS

| | | | | |
|---|---|---|---|---|
| 1,882,487 A | * | 10/1932 | Dupont | 310/65 |
| 3,671,787 A | * | 6/1972 | Herron | 310/154.11 |
| 3,783,318 A | * | 1/1974 | Widstrand | 310/216 |
| 5,173,629 A | * | 12/1992 | Peters | 310/216 |
| 5,218,252 A | * | 6/1993 | Iseman et al. | 310/64 |
| 5,491,371 A | * | 2/1996 | Ooi | 310/58 |
| 6,747,379 B2 | * | 6/2004 | LaBrush | 310/51 |

FOREIGN PATENT DOCUMENTS

| | | | | |
|---|---|---|---|---|
| EP | 342332 | * | 11/1989 | ............ H02K 1/20 |
| GB | 218683 | * | 11/1924 | |
| GB | 366492 | * | 1/1932 | |
| GB | 573773 | * | 12/1945 | |
| GB | 2303745 | * | 2/1997 | ............ H02K 1/14 |
| JP | 63-55377 | * | 3/1988 | ........... F04B 39/00 |
| JP | 4-17556 | * | 1/1992 | .......... H02K 29/00 |
| JP | 4-145852 | * | 5/1992 | ............ H02K 1/20 |

* cited by examiner

Primary Examiner—Burton Mullins
(74) Attorney, Agent, or Firm—Edward P. Dutkiewicz

(57) ABSTRACT

A plurality of similarly configured plates have an essentially circular exterior peripheral ring and an essentially circular interior opening with a plurality of radial legs extending inwardly from the ring with an exterior diameter. A plurality of similarly configured thin fins has an essentially circular exterior peripheral ring with an exterior diameter, an essentially circular interior opening, and a plurality of radial legs extending inwardly from the ring. The exterior diameter of the fins is greater than the exterior diameter of the plates. The plurality of plates are in stacks with their rings, openings and spaces in alignment. Each of a plurality of fins is located between a stack of plates. The rings, openings and spaces of the fins are in alignment with the rings, openings and spaces of the plates.

3 Claims, 4 Drawing Sheets

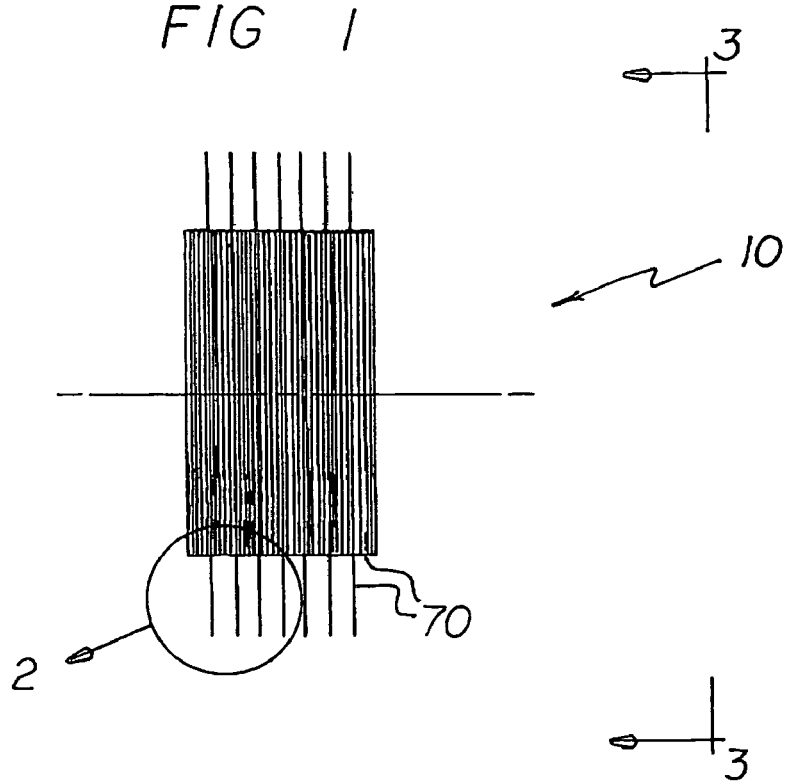
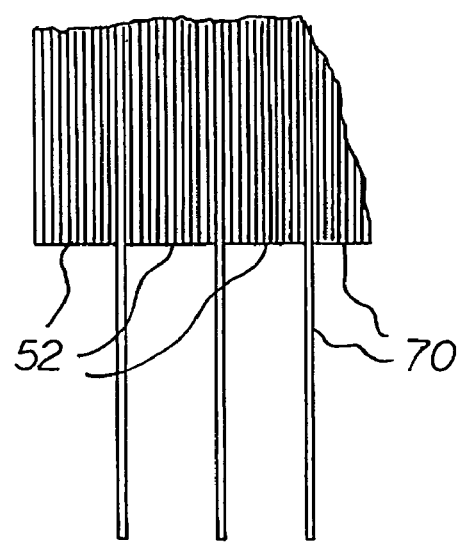

FIG 3
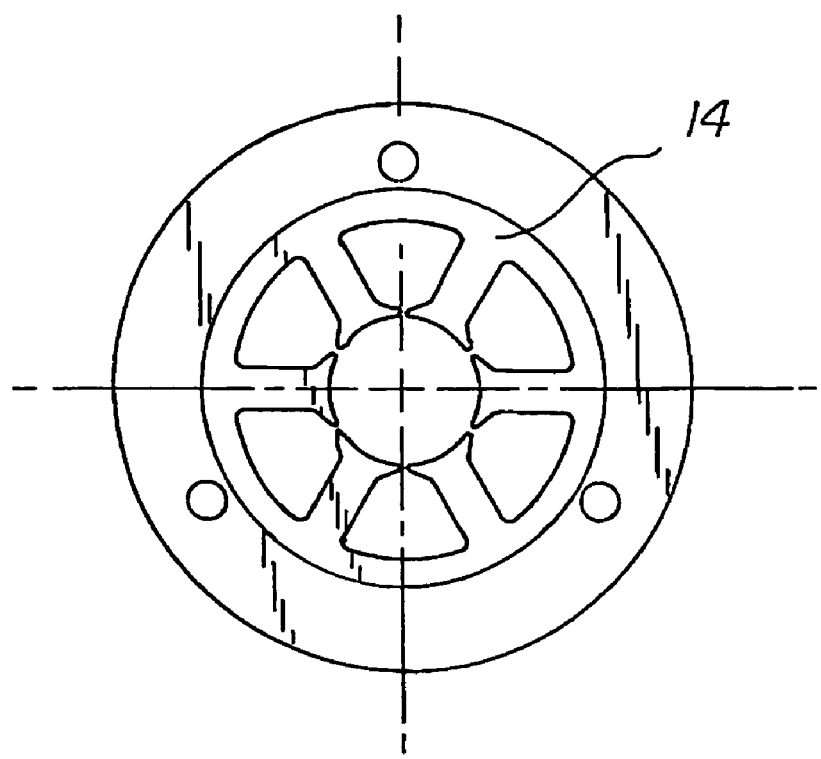
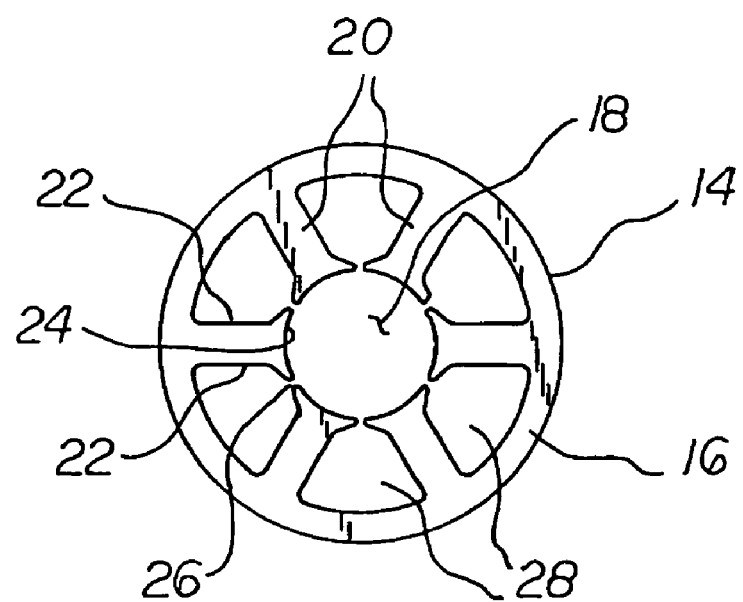
FIG 4

MOTOR STATOR AND HEAT SINK SYSTEM

BACKGROUND OF THE INVENTION

1. Field of the Invention

The present invention relates to a motor stator and heat sink system and more particularly pertains to facilitating the manufacture and use of electrical components through tailored stacking and cooling.

2. Description of the Prior Art

The use of motor stators and heat sinks is known in the prior art. More specifically, motor stators and heat sinks previously devised and utilized for the purpose of manufacturing and using electrical components are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,473,332 issued Jun. 14, 1949 to England relates to an insulation means for electrical apparatus. U.S. Pat. No. 4,217,690 issued Aug. 19, 1980 to Morreale relates to a method of assembly for electrical motor stators. Lastly, U.S. Pat. No. 5,796,202 issued Aug. 18, 1998 to Herron relates to a tie bolt and stacked wheel assembly for the rotor of a rotary machine.

While these devices fulfill their respective, particular objectives and requirements, the aforementioned patents do not describe motor stator and heat sink system that allows facilitating the manufacture and use of electrical components through tailored stacking and cooling.

In this respect, the motor stator and heat sink system according to the present invention substantially departs from the conventional concepts and designs of the prior art, and in doing so provides an apparatus primarily developed for the purpose of facilitating the manufacture and use of electrical components through tailored stacking and cooling.

Therefore, it can be appreciated that there exists a continuing need for a new and improved motor stator and heat sink system which can be used for facilitating the manufacture and use of electrical components through tailored stacking and cooling. In this regard, the present invention substantially fulfills this need.

SUMMARY OF THE INVENTION

In view of the foregoing disadvantages inherent in the known types of motor stators and heat sinks now present in the prior art, the present invention provides an improved motor stator and heat sink system. As such, the general purpose of the present invention, which will be described subsequently in greater detail, is to provide a new and improved motor stator and heat sink system and method which has all the advantages of the prior art and none of the disadvantages.

To attain this, the present invention essentially comprises a plurality of similarly configured thin plates. The plates are fabricated of an electrically conductive material. The material is preferably steel. Each plate has an essentially circular imperforate exterior peripheral ring, an exterior diameter and an essentially circular interior opening. A plurality of radial legs is provided. The legs extend inwardly from the peripheral ring at symmetrically spaced locations. The legs terminate at the interior opening. The legs have parallel, essentially radial, edges. The edges are provided along the majority of their lengths. Enlargements are provided. He enlargements are provided adjacent to the interior opening. Provided between the enlargements and adjacent to the opening are small spaces. Provided between the legs and along the majority of their extents are wedge shaped spaces. The radius of the interior opening is less than the radial dimension of the legs. The radial dimension of the ring is less than the radius of the interior opening.

A plurality of similarly configured thin fins is provided. The fins are fabricated of an electrically conductive material. The material is preferably steel. Each fin has an essentially circular exterior peripheral ring, an exterior diameter and an essentially circular interior opening. A plurality of radial legs is provided. The legs extend inwardly from the peripheral ring at symmetrically spaced locations. The legs terminate at the interior opening. The legs have parallel, essentially radial, edges along the majority of their lengths. Enlargements are provided. The enlargements are provided adjacent to the interior opening. Small spaces are provided between the enlargements adjacent to the opening. Provided between the legs along the majority of their extents and adjacent to the opening are wedge shaped spaces. The radius of the interior opening is less than the radial dimension of the legs. The radial dimension of the ring is greater than the radial dimension of the legs. The fins are similarly configured to the plates except for the radial extent of the rings.

Provided next is a plurality of plates in stacks. A plurality of fins is provided. Each fin is located between a stack of plates. The rings and openings and spaces of the fins are in alignment with the rings and openings and spaces of the plates.

Provided last is a layer of an adhesive. The adhesive covers the plates and fins and are bonded together to complete a motor stack and fin assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor stator and heat sink system which has all of the advantages of the prior art motor stators and heat sinks and none of the disadvantages.

It is another object of the present invention to provide a new and improved motor stator and heat sink system which may be easily and efficiently manufactured and marketed.

It is further object of the present invention to provide a new and improved motor stator and heat sink system which is of durable and reliable constructions.

An even further object of the present invention is to provide a new and improved motor stator and heat sink system which is susceptible of a low cost of manufacture with regard to both materials and labor, and which accordingly is then susceptible of low prices of sale to the consuming public, thereby making such motor stator and heat sink system economically available to the buying public.

Even still another object of the present invention is to provide a motor stator and heat sink system for facilitating the manufacture and use of electrical components through tailored stacking and cooling.

Lastly, it is an object of the present invention to provide a new and improved motor stator and heat sink system. A plurality of similarly configured plates have an essentially circular exterior peripheral ring and an essentially circular interior opening with a plurality of radial legs extending inwardly from the ring. A plurality of similarly configured fins has an essentially circular exterior peripheral ring with an exterior diameter, an essentially circular interior opening, and a plurality of radial legs extending inwardly from the ring. A plurality of plates are in stacks with their rings, openings and spaces in alignment. A plurality of fins is provided. Each fin is located between a stack of plates. The rings, openings and spaces of the fins are in alignment with the rings, openings and spaces of the plates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a motor stator and heat sink system constructed in accordance with the principles of the present invention.

FIG. 2 is an enlarged side elevational view taken at circle 2 of FIG. 1.

FIG. 3 is a front elevational view take along line 3—3 of FIG. 1.

FIG. 4 is a front elevational view of one of the plates shown in the prior Figures.

The same reference numerals refer to the same parts throughout the various Figures.

DESCRIPTION OF THE PREFERRED EMBODIMENT

Figure 5:
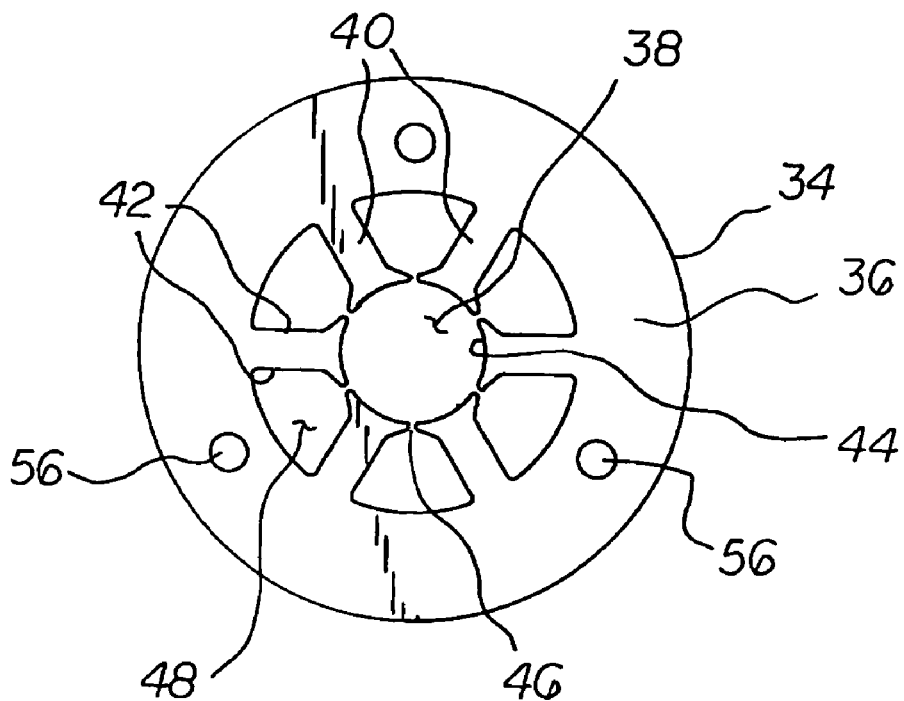
FIG. 5 is a front elevational view of one of the fins shown in the prior Figures.

With reference now to the drawings, and in particular to FIG. 1 thereof, the preferred embodiment of the new and improved motor stator and heat sink system embodying the principles and concepts of the present invention and generally designated by the reference numeral 10 will be described.

The present invention, the motor stator and heat sink system 10 is comprised of a plurality of components. Such components in their broadest context include a plurality of similarly configured thin plates, a plurality of similarly configured thin fins and a plurality of plates in stacks. Such components are individually configured and correlated with respect to each other so as to attain the desired objective.

First provided is a plurality of similarly configured thin plates 14. The plates are fabricated of an electrically conductive material. The material is preferably steel, silicon steel. Each plate has an essentially circular imperforate exterior peripheral ring 16, an exterior diameter and an essentially circular interior opening 18. A plurality of radial legs 20 is provided. The legs extend inwardly from the peripheral ring at symmetrically spaced locations. The legs terminate at the interior opening. The legs have parallel, essentially radial, edges 22. The edges are provided along the majority of their lengths. Enlargements 24 are provided. He enlargements are provided adjacent to the interior opening. Provided between the enlargements and adjacent to the opening are small spaces 26. Provided between the legs and along the majority of their extents are wedge shaped spaces 28. The radius of the interior opening is less than the radial dimension of the legs. The radial dimension of the ring is less than the radius of the interior opening.

A plurality of similarly configured thin fins 34 is provided. The fins are fabricated of an electrically conductive material. The material is preferably steel, silicon steel. Each fin has an essentially circular exterior peripheral ring 36, an exterior diameter and an essentially circular interior opening 38. A plurality of radial legs 40 is provided. The legs extend inwardly from the peripheral ring at symmetrically spaced locations. The legs terminate at the interior opening. The legs have parallel, essentially radial, edges 42 along the majority of their lengths. Enlargements 44 are provided. The enlargements are provided adjacent to the interior opening. Small spaces 46 are provided between the enlargements adjacent to the opening. Provided between the legs along the majority of their extents and adjacent to the opening are wedge shaped spaces 48. The radius of the interior opening is less than the radial dimension of the legs. The radial dimension of the ring is greater than the radial dimension of the legs. The fins are similarly configured to the plates except for the radial extent of the rings.

Provided next is a plurality of plates in stacks 52. A plurality of fins is provided. Each fin is located between a stack of plates. The rings and openings and spaces of the fins are in alignment with the rings and openings and spaces of the plates.

The size and number of plates in any given stack as well as the number of stacks in any given system is a function of the particular application. In like manner, the size and number of fins in any given system for cooling purposes through a heat sink is a function of the particular application. The similarity of component parts for a wide variety of systems allows a user to conveniently tailor the manufacture of a large number of systems as a function of the applications.

Further provided is a coupling assembly. The coupling assembly includes a plurality of symmetrically spaced apertures 56 in the ring of each fin. The apertures are in axial alignment. The apertures are located radially exterior of the rings of the plates.

Provided last is a layer of an adhesive 70. The adhesive covers the plates and the fins and are bonded together to complete a motor stack and fin assembly.

Figure 6:
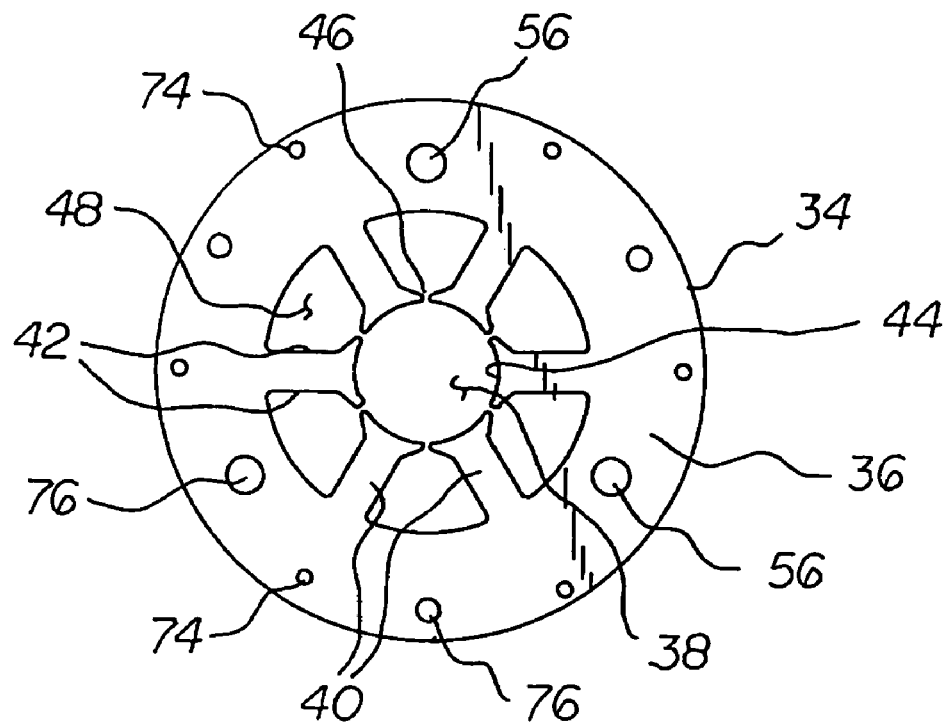
FIG. 6 is a front elevational view of one of the fins constructed in accordance with an alternate embodiment of the invention.
Figure 7:
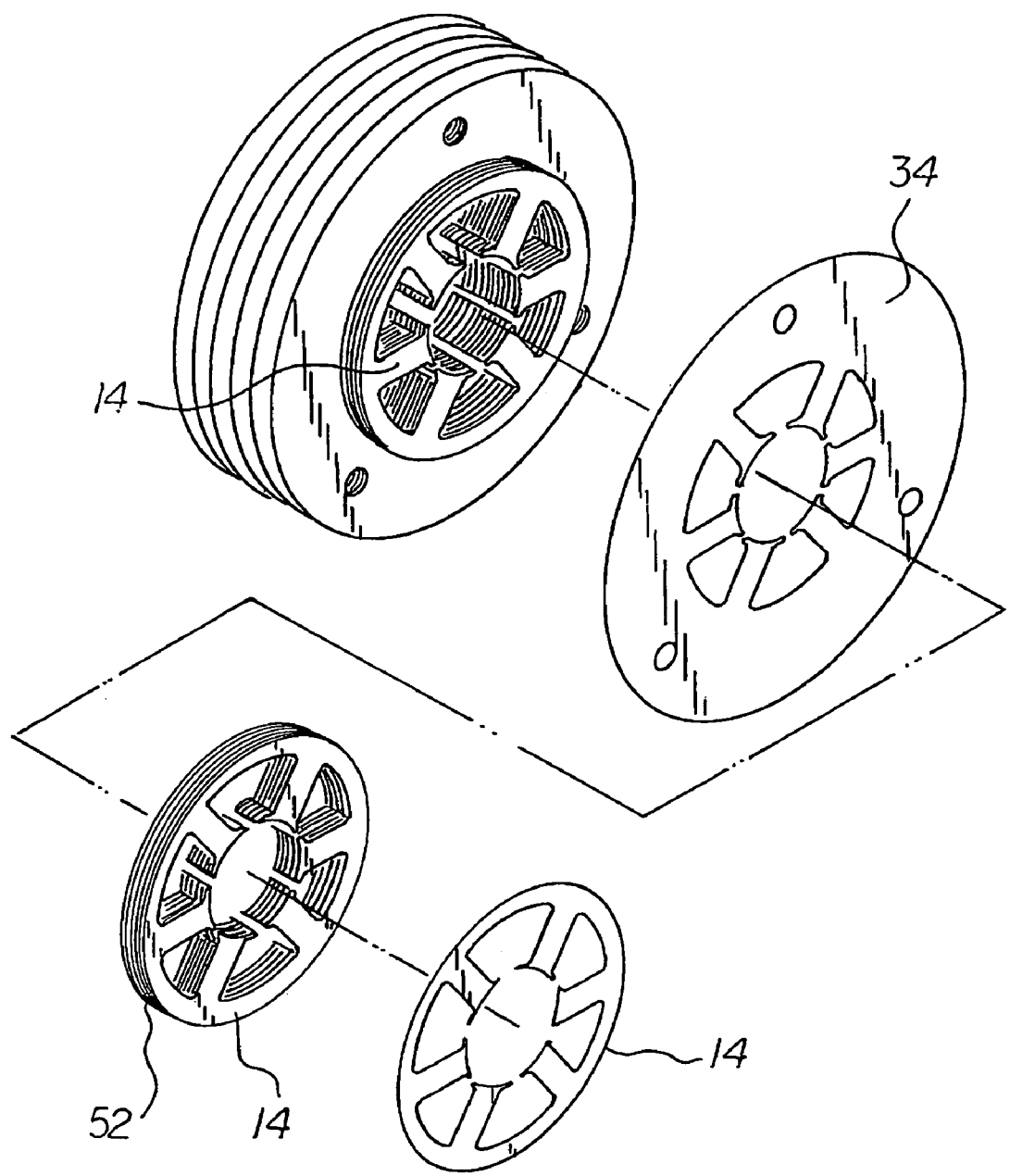
FIG. 7 is an exploded perspective view of the primary embodiment of the invention.

An alternate embodiment of the invention is shown in FIG. 6. In such embodiment, the holes through the ring of each fin is in a plurality of sizes, small holes 74, medium holes 76 and large holes 56 as in the prior primary embodiment. The size of the holes and the number of holes per fin is a function of the application.

In another alternate embodiment of the invention, the lamination or adhesive may be pierced together at the time of punching laminations and make stator stacks to size in high volume production. This will omit operations of roller-coating laminations and curing in over, fix-saving in production. More specifically, this alternate embodiment permits high volume operations since the laminated material may be stacked with non-laminated material and then all stacked and punched with the same operation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A motor stator and heat sink system for facilitating the manufacture and use of electrical components through tailored stacking and cooling comprising, in combination:
   a plurality of similarly configured thin plates fabricated of an electrically conductive material, each plate having an essentially circular imperforate exterior peripheral ring with an exterior diameter and an essentially circular interior opening with a plurality of radial legs extending inwardly from the peripheral ring at symmetrically spaced locations and terminating at the interior opening, the legs having parallel, essentially radial, edges along the majority of their lengths with enlargements adjacent to the interior opening, small spaces between the enlargements adjacent to the opening and wedge shaped spaces between the legs along the majority of their extents, the radius of the interior opening being less than the radial dimension of the legs and the radial dimension of the ring being less than the radius of the interior opening;
   a plurality of similarly configured thin fins fabricated of an electrically conductive material, each fin having an essentially circular exterior peripheral ring with an exterior diameter and an essentially circular interior opening with a plurality of radial legs extending inwardly from the peripheral ring at symmetrically spaced locations and terminating at the interior opening, the legs having parallel, essentially radial, edges along the majority of their lengths with enlargements adjacent to the interior opening, small spaces between the enlargements adjacent to the opening and wedge shaped spaces between the legs along the majority of their extents, the radius of the interior opening being less than the radial dimension of the legs and the radial dimension of the ring being greater than the radial dimension of the legs, the fins being similarly configured to the plates except for the radial extent of the rings;
   a plurality of plates in stacks with their rings and openings and spaces in alignment and a plurality of fins, each fin being located between a stack of plates, the rings and openings and spaces of the fins being in alignment with the rings and openings and spaces of the plates; and
   a layer of an adhesive covering the plates and fins.

2. A motor stator and heat sink system:
   a plurality of similarly configured plates having a circular exterior peripheral ring with an exterior diameter and an essentially circular interior opening with a plurality of radial legs extending inwardly from the ring; and
   a plurality of similarly configured thin fins having a circular exterior peripheral ring with an exterior diameter and an essentially circular interior opening with a plurality of radial legs extending inwardly from the ring, the exterior diameter of the fins being greater than the exterior diameter of the plates;
   the plurality of plates in stacks with their rings and openings and spaces in alignment and a plurality of fins, each fin being located between a stack of plates, the rings and openings and spaces of the fins being in alignment with the rings and openings and spaces of the plates; and
   a coupling assembly including a plurality of symmetrically spaced apertures in the ring of each fin, the apertures being in axial alignment and located radially exterior of the rings of the plates.

3. The system as set forth in claim 2 and further including a layer of an adhesive covering the plates and fins.

* * * * *